United States Patent [19]
Suenaga et al.

[11] Patent Number: 5,920,432
[45] Date of Patent: Jul. 6, 1999

[54] MICROSCOPE OBJECTIVE LENS

[75] Inventors: Yutaka Suenaga; Katsuya Watanabe, both of Yokohama, Japan

[73] Assignee: Nikon Corporation, Tokyo, Japan

[21] Appl. No.: 09/014,501

[22] Filed: Jan. 28, 1998

[30] Foreign Application Priority Data

Jan. 29, 1997 [JP] Japan .................................. 9-014971

[51] Int. Cl.⁶ .................................................. G02B 21/02
[52] U.S. Cl. ............................................................ 359/656
[58] Field of Search .................................... 359/656, 657, 359/658, 659, 660, 661

[56] References Cited

U.S. PATENT DOCUMENTS 3,623,792  11/1971  Uetake ................................ 350/229
4,101,201   7/1978  Tojyo ................................. 350/175
4,403,835   9/1983  Ushida ............................... 350/414

Primary Examiner—Georgia Epps
Assistant Examiner—Michael Lucas
Attorney, Agent, or Firm—Chapman and Cutler

[57] ABSTRACT

An objective lens comprising a positive-refractive power front-side lens group Lf having a junction meniscus lens or a meniscus single lens whose concave side faces the object and a rear-side lens group Lr placed behind said front-side lens group. In said front-side lens group, the refractive index nF and the Abbe's number υF of the glass materials of the meniscus lens nearest the object and also the refractive index nR and the Abbe's number υR of glass materials of convex lenses out of said rear-side lens group satisfy the following conditions:

$nF \leq 1.50, \upsilon F > 65$        (1)

$nR \leq 1.65, 35 < \upsilon R < 50$        (2)

20 Claims, 7 Drawing Sheets

MICROSCOPE OBJECTIVE LENS

BACKGROUND OF THE INVENTION

1. Field of the Invention

The present invention relates in general to a microscope objective lens usable in usual bright field observation as well as in fluorescence observation and in particular to a microscope objective lens with a large numerical aperture having excellent performance in fluorescence observation by means of near-ultraviolet excitation (excitation wave-length: 340 to 380 nm).

2. Description of the Related Art

Recently, study has been much conducted into calcium ions having vital effects in organisms, for which purpose fluorescent microscopes have been used to measure timewise concentration variations of calcium ions in the cell. In such measurement, an ultraviolet light with a near ultraviolet wave-length of 340 to 380 nm is applied as an excitation light to an observation target, so that fluorescence caused by the ultraviolet-light excitation may be observed. When, in such a way, fluorescence is observed by a typical application-type fluorescent microscope in which the objective lens acts also as a condenser, the excitation light is applied through the objective lens onto an observation target, to observe fluorescence generated by the target. Therefore, the objective lens in this case requires the following special arrangement with respect to near-ultraviolet light (excitation light).

First, the objective lens needs to provide a sufficient transmission factor (transmissivity) in the near-ultraviolet light range, i.e. the range of the excitation light. A typical conventional objective lens suffers from a rapid decrease in transmission factor against ultraviolet-range light, and it is difficult to excite a sample(observation target) with a near-ultraviolet light, so that an objective lens having a high transmission factor for near-ultraviolet light is desired. It is also necessary to inhibit as much as possible self-emission and solarization which are observed when an excitation light is applied to the glass material of the objective lens. Moreover, since the intensity of fluorescence caused by the application of an excitation light is extremely small as compared to the intensity of the excitation light, the objective lens needs to have a very high numerical aperture so as to be able to capture such a small intensity of fluorescence. Thus, a fluorescent objective lens is very difficult to design, because the types of glass materials that can be used are limited and a high numerical aperture is required.

This a type of fluorescent objective lens has already been proposed in a few disclosures, for example, laid-open patent publication Sho 55-79406 and laid-open patent publication Sho 55-79408. The objective lenses disclosed in those laid-open publications are made of glass taking into consideration the transmission factor in the near-ultraviolet light range and are designed to be used as the above-explained fluorescent objective lens.

However, the above-mentioned microscope systems corrects magnification chromatic aberration generated by the objective lens at the eye-piece, thus suffering from the disadvantage that these systems are effective only by combining the objective lens with a prescribed eye-piece. That is, in the present microscope systems, the objective lens and the eye-piece each correct magnification chromatic aberration independently of each other, so that such microscope systems using any objective lens disclosed in the above-mentioned laid-open publications suffer from the disadvantage that magnification chromatic aberration generated by the objective lens will remain uncorrected.

Both laid-open patent publications Hei 5-142477 and Hei 7-230039 (especially, embodiments 1 and 2) also disclose objective lenses suited for fluorescence observation. However, since the objective lenses disclosed in these publications are of a liquid immersion type, these objective lenses have a larger numerical aperture but are inferior in convenience to dry-system objective lenses. Moreover, in the objective lenses disclosed in these publications it is difficult to reduce the Petzval's sum, so that a complicated arrangement is required for the relevant lens system to achieve a certain desired degree of flatness of the image surface, which increases the cost of the system.

Also, embodiments 3 and 4 of laid-open patent publication Hei 7-230039 disclose dry-system objective lenses which have a large numerical aperture and are well corrected in terms of secondary dispersion. However, in these systems, if the image height exceeds 5.5 mm, the comatic aberration worsens, which is problematic for wide-range observation.

As noted above, in order to improve the transmission factor of excitation lights in the near-ultraviolet range (e.g., 340 nm), only a few glass materials having a high refractive index and a high dispersion can be employed. Therefore, in designing objective lenses with large numerical apertures made of limited types of glass materials, imaging performance has inevitably been sacrificed to some extent.

In consideration of these problems, it is an object of the present invention to provide a microscope objective lens with a large numerical aperture that is made of a glass material having a high transmission factor in the near-ultraviolet range and that is capable of properly correcting spherical aberration, comatic aberration, and chromatic aberration including secondary spectrum and also that provides imaging effective up to the view field periphery for the case of bright field observation as well as fluorescence observation.

SUMMARY OF THE INVENTION

To this aim, a microscope objective lens of the present invention has in configuration a junction meniscus lens or a meniscus single lens with the concave side facing an object and a group of front-side lenses having a positive refractive power as a whole arranged on the side of the object as well as a group of rear-side lenses arranged on the side of the image at an appropriate distance from the front-side lens group. In this arrangement, specific glass materials are selected in such a way that the refractive index nF and the Abbe's number $\upsilon$F of the glass material of the meniscus single lens and at least one lens element of the junction meniscus lens of the front-side lens group nearest the object and also the refractive index nR and the Abbe's number $\upsilon$R of a glass material of at least one of the lens elements with positive-refractive power satisfy the following conditionals (1) and (2):

$$nF \leq 1.50, \upsilon F > 65 \qquad (1)$$

$$nR \leq 1.65, 35 < \upsilon R < 50 \qquad (2)$$

Moreover, the glass materials should preferably be such that the Abbe's number $\upsilon$Rn of glass materials of lens elements with negative-refractive power included in the rear-side lens group, the total sum Ts of the central thicknesses of only the glass parts of all the lenses constituting the front-side and the rear-side lens groups, and another total sum Tf of the central thicknesses of all the lenses of the system which are made of glass materials with an Abbe's number of 50 or less satisfy the following conditions (3) and (4).

$$\nu Rn > 60 \quad (3)$$

$$(Tf/Ts) < 0.25 \quad (4)$$

It is also preferable that of the front-side lens group, a junction lens having a positive-refractive index be arranged on the side of the image as viewed from the junction meniscus lens or the meniscus single lens nearest the object, to correct chromatic aberration, the spherical aberration, etc. on the negative junction surface of the junction lens. Since junction meniscus lenses or meniscus single lenses which satisfy the above-mentioned condition (1) have a rather low refractive index, light flux emitted out from any of the lenses tends to be insufficient in correction of either chromatic aberration or spherical aberration, so that it is desirable to eliminate this insufficiency by using a positive-refractive power junction lens and also to correct various kinds of aberration by using the negative junction surface of said positive-refractive power junction lens.

DESCRIPTION OF THE PREFERRED EMBODIMENTS

Figure 1:
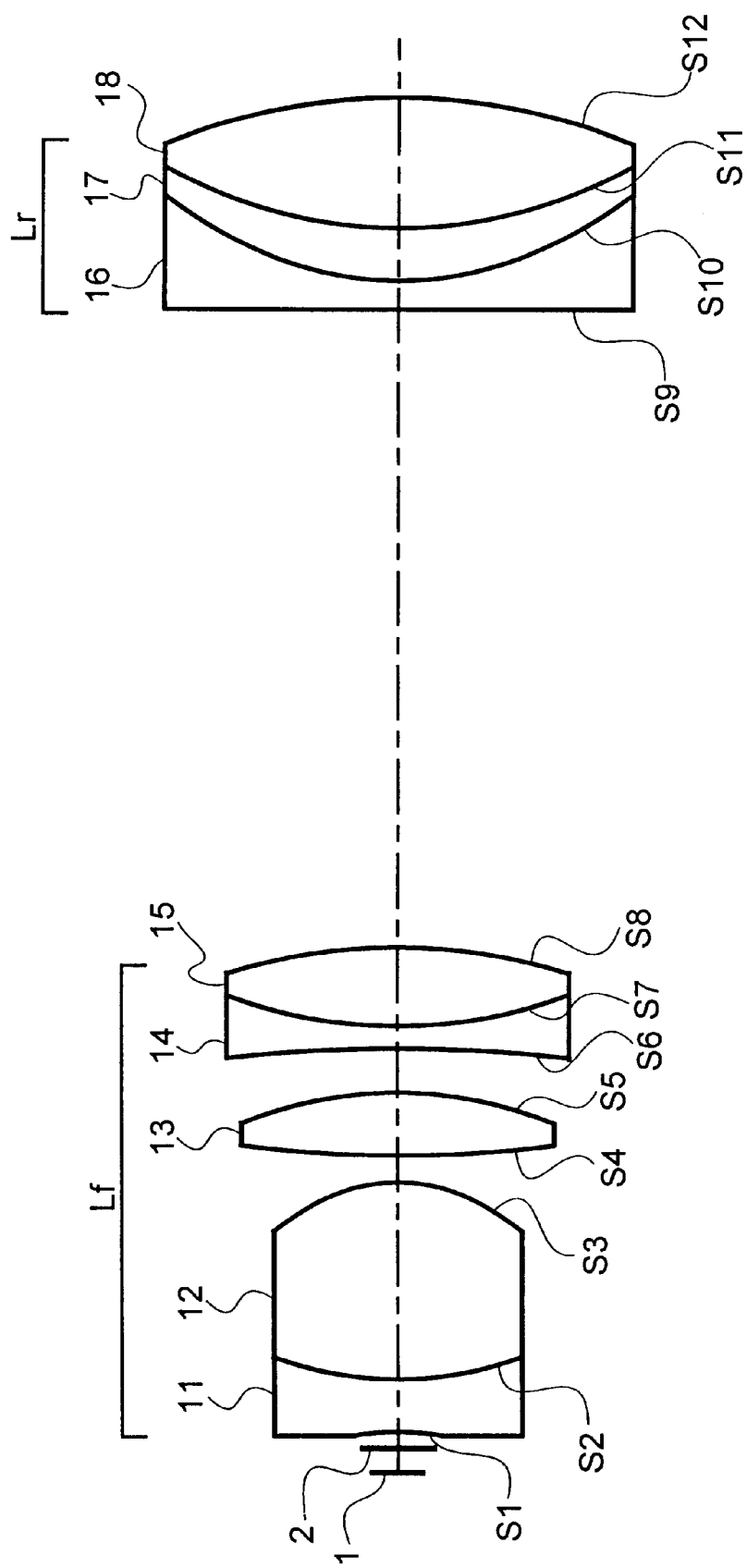
FIG. 1 is a schematic illustration of a configuration of objective lenses related to a first embodiment of the present invention.

In objective lenses, generally, the front group (front-side lenses) needs to have a strongly convex lens component that converts divergent light flux emitted from an object into convergent light flux, the refractive index of which however becomes larger as the lens component comes nearer the object. Therefore, in an objective lens configuration having a middle magnification to a large magnification, lens (first lens) nearest the object has large effects, specifically the largest effects, on aberration correction throughout the lens system as a whole.

To inhibit the occurrence of spherical aberration and comatic aberration, the following method is available. The radius of curvature of the concave side of the lens group, i.e. of the lens surface of the first lens on the side of the object, is made equal to or extremely nearly equal to the distance from the observation target (the object) so that the convex side of the first lens on the side of the image is an aplanatic surface. In actually used objective lenses, however, the first lens very rarely satisfies such conditions.

First of all, the curvature radius of the concave side of the first lens on the object side is generally too small to be made equal to the distance from an observation target, so that a sufficient working distance cannot be secured. Also, although it may be possible to eliminate spherical aberration by making the convex side of the first lens aplanatic on the image side, in an attempt to obtain a lens with a large numerical aperture and a wide field of view in an objective lens configuration with a middle magnification having a relatively large angle of view, a high-order comatic aberration occurs as the image height increases, which is easily damaged by extra-axial light. Given this, the geometry of the first lens must be decided upon in consideration of a balance between the axial light and the extra-axial light, so that it is difficult to completely satisfy the conditions of aplanatism while the same time keeping the geometry of the first lens nearly equal to that of an aplanatic lens.

For these reasons, the first lens must allow for spherical aberration and other kinds of aberration to some extent, the intensity of which, however, should be reduced to a minimum as much as possible. Operating from this point of view, designers or manufacturers of conventional fluorescent objective lenses have often employed such glass materials as have the largest possible refractive index even out of very severely chosen materials, although glass materials with a large refractive index and a low dispersion are suited for the first lens.

However, in order to improve a near-ultraviolet range light having a wave-length of about 340 nm, the transmission factor loss of the first lens must be reduced and, therefore, the first lens needs to be composed of a glass material which has a high transmission factor. Also, objective lenses having low to middle magnifications are more satisfactory in terms of Petzval's sum and comatic aberration, as the central thickness of the first lens becomes larger. From this viewpoint, therefore, it is necessary to keep a required minimum central thickness by employing such glass materials as have a high transmission factor for light in the near-ultraviolet range. It should be noted that glass materials which have high transmission factors have small refractive indices.

In addition, since the first lens is placed nearest the object (observation target), when the first lens has received an excitation light and emitted fluorescence (self-emission), the image of the fluorescence is nearest to the observed image surface. As can be seen from the above explanation, fluorescence emitted from a first lens will have the largest effects as observed from an observation target, thus contributing largest to decreases in the contrast of the observed image. Given this, it is very important to reduce the fluorescence generated by the first lens as much as possible.

In light of the above explanation, in the configuration of objective lenses of the present invention, which comprises meniscus single lenses or junction meniscus lenses in which the concave side of the first lens faces the object, the choice of glass materials that can be employed for the first lens is regulated by the above-stated condition (1). Glass materials satisfying condition (1) have a high transmission factor and a low self-fluorescence. When the first lens is made of such glass materials which satisfy condition (1), it is possible to sufficiently transmit an excitation light so that a high-intensity excitation light can be applied to an observation target in order that a fluorescent image of the observation target can be observed at high contrast.

If, on the other hand, the first lens is made of glass materials which do not satisfy the condition (1), i.e. which have a refractive index in excess of 1.5 and an Abbe's number of 65 or less, a transmission factor deteriorates for light in the near-ultraviolet range in particular, thus increasing the self-fluorescence of the first lens. In this case, in an application-type fluorescent microscope, the excitation light for application-type illumination is absorbed through the objective lens, so as to decrease the intensity of the excitation light to be illuminated to the observation target and also to cause self-fluorescence of the first lens, which adversely affects the fluorescence image of the observation target, thus deteriorating the contrast of the observed image.

It may be considered an option to make the central thickness of the lenses thinner in order to maintain a proper transmission factor even when glass materials not satisfying the condition (1) are employed. This case, however, suffers from an aberration of the extra-axial light, in particular a lower-side comatic aberration.

The microscope objective lens of the present invention includes a junction lens having positive-refractive power on the rear side (image side) of the first lens. Since glass materials satisfying condition (1) have a rather low refractive index, light flux emitted out from the first lens tends to be insufficient to correct chromatic aberration or spherical aberration. To guard against this problem, the positive-refractive power junction lens is employed to eliminate this insufficiency and, moreover, to correct various kinds of aberration with the negative junction surface thereof. It is also preferable not to employ glass materials which have a large dispersion for the concave lenses of the junction lens, in consideration of the transmission factor of these glass materials.

Thus, in the microscope objective lens of the present invention, light flux having passed through a front-side lens group with positive refractive power is introduced to a rear-side lens group arranged at a proper distance on the side of the image. The light flux in this situation is corrected as explained above in terms of spherical aberration and axial chromatic aberration but not sufficiently corrected in terms of magnification chromatic aberration. As described above, in order to correct aberration (chromatic aberration) by objective lenses and eye-pieces independently of each other, it is naturally necessary to correct also magnification chromatic aberration in an objective-lens system. To do so, glass materials having a large dispersion must inevitably be selected to make positive-refractive index lenses in the rear-side lens group, according to the condition (2).

If the positive-refractive power lenses in the rear-side lens group are made of glass materials which have a refractive index in excess of 1.65 and an Abbe's number of 35 or less, the concerned objective lens as a whole is not suitable as a fluorescent objective lens because it will have a poor transmission factor in the near-ultraviolet range. Also, since magnification chromatic aberration cannot sufficiently be corrected by the front-side lens group, it is necessary to excessively correct magnification chromatic aberration in the rear-side lens group. This means that positive-refractive power lenses with a large dispersion and negative-refractive power lenses with a small dispersion are required, thus making it difficult to correct magnification chromatic aberration if the Abbe's number of the positive-refractive power lenses exceeds 50.

As can be seen from the preceding explanation, to obtain a sufficient transmission factor for light in the near-ultraviolet range, it is necessary to decrease dispersion, i.e. to increase the Abbe's number, of the positive-refractive power lenses; and to sufficiently correct magnification chromatic aberration, it is necessary to increase the dispersion, i.e. to decrease the Abbe's number, of the positive-refractive power lenses. However, even without increasing the dispersion of the positive-refractive power lenses, magnification chromatic aberration can be corrected by decreasing the dispersion of the negative-refractive power lenses included in the rear-side lens group. These desiderata are governed by condition (3).

To have a good geometry as a fluorescent objective lens, it is desirable for any objective lens to satisfy condition (4). Condition (4) regulates the proportion of the total sum of the central thicknesses of the glass materials (flint glass) having an Abbe's number of 50 or less to the total sum of the central thicknesses of only the glass parts of the lenses of the whole objective lens system (front-side and rear-side lens groups). Since flint glass, when it does not satisfy condition (4), is generally inferior to crown glass in respect of its transmission factor for short wave-lengths, such flint glass cannot provide a sufficient transmission factor for light in the near-ultraviolet range in particular (e.g., light of a wavelength of 340 nm).

By satisfying the above-explained conditional expressions, it is possible to provide fluorescent microscope objective lenses that have a relatively large numerical aperture and that also are excellent in respect of transmission factor for light in the near-ultraviolet range.

[EMBODIMENTS]

In the following, various embodiments of lens configurations will be described with reference to the accompanying drawings. As for the parameters in the tables referred to in the discussion of the embodiments, f represents the focal distance of an objective lens, N.A. represents the numerical aperture, β represents the magnification, and W.D. represents the working distance. Also, r represents the radius of curvature for a given lens surface, d represents the inter-surface distance for a given lens, and nd and υd respectively represent the refractive index and the Abbe's number for line d (587.6 nm). The embodiments described here assume that cover glass is used between a sample and an objective lens, which cover glass has a thickness of 0.17 mm, a refractive index nd of 1.52216, and an Abbe's number υd of 58.8.

[FIRST EMBODIMENT]

FIG. 1 shows an objective lens according to a first embodiment of the present invention, which objective lens comprises a front-side lens group Lf and a rear-side lens group Lr. The front-side lens group comprises, sequentially from the object side, a junction meniscus lens whose concave side faces the object and which combines a concave lens 11 and a convex lens 12, a convex lens 13, and a junction lens combining a concave lens 14 and a convex lens 15, while the rear-side lens group Lr comprises a junction lens combining a concave lens 16 and convex lenses 17 and 18. Between an observation sample surface 1 and the objective lens, the above-mentioned cover glass 2 is positioned.

Table 1 gives the above-mentioned lens parameters. The objective lens has a focal distance f=20.0 mm, a numerical aperture N.A.=0.5, a magnification β=−10.0, and a working distance W.D.=1.60 mm.

[TABLE 1]

| LENS SURFACE (s) | RADIUS OF CURVATURE (r) | SURFACE SPACING (d) | REFRACTIVE INDEX (nd) | ABBE'S NUMBER (vd) |
|---|---|---|---|---|
| 1) | −8.183 | 2.5 | 1.52682 | 51.35 |
| 2) | 16.413 | 9.0 | 1.43388 | 95.57 |
| 3) | −8.930 | 1.3 | | |
| 4) | 73.904 | 2.9 | 1.48563 | 85.20 |
| 5) | −18.738 | 1.9 | | |
| 6) | −83.591 | 1.0 | 1.62044 | 38.35 |
| 7) | 21.997 | 3.8 | 1.48563 | 85.20 |
| 8) | −28.949 | 29.4 | | |
| 9) | −517.765 | 1.2 | 1.58913 | 61.09 |
| 10) | 16.930 | 2.5 | 1.62044 | 38.35 |
| 11) | 23.875 | 5.9 | 1.43388 | 95.57 |
| 12) | −30.181 | | | |

Figure 2:
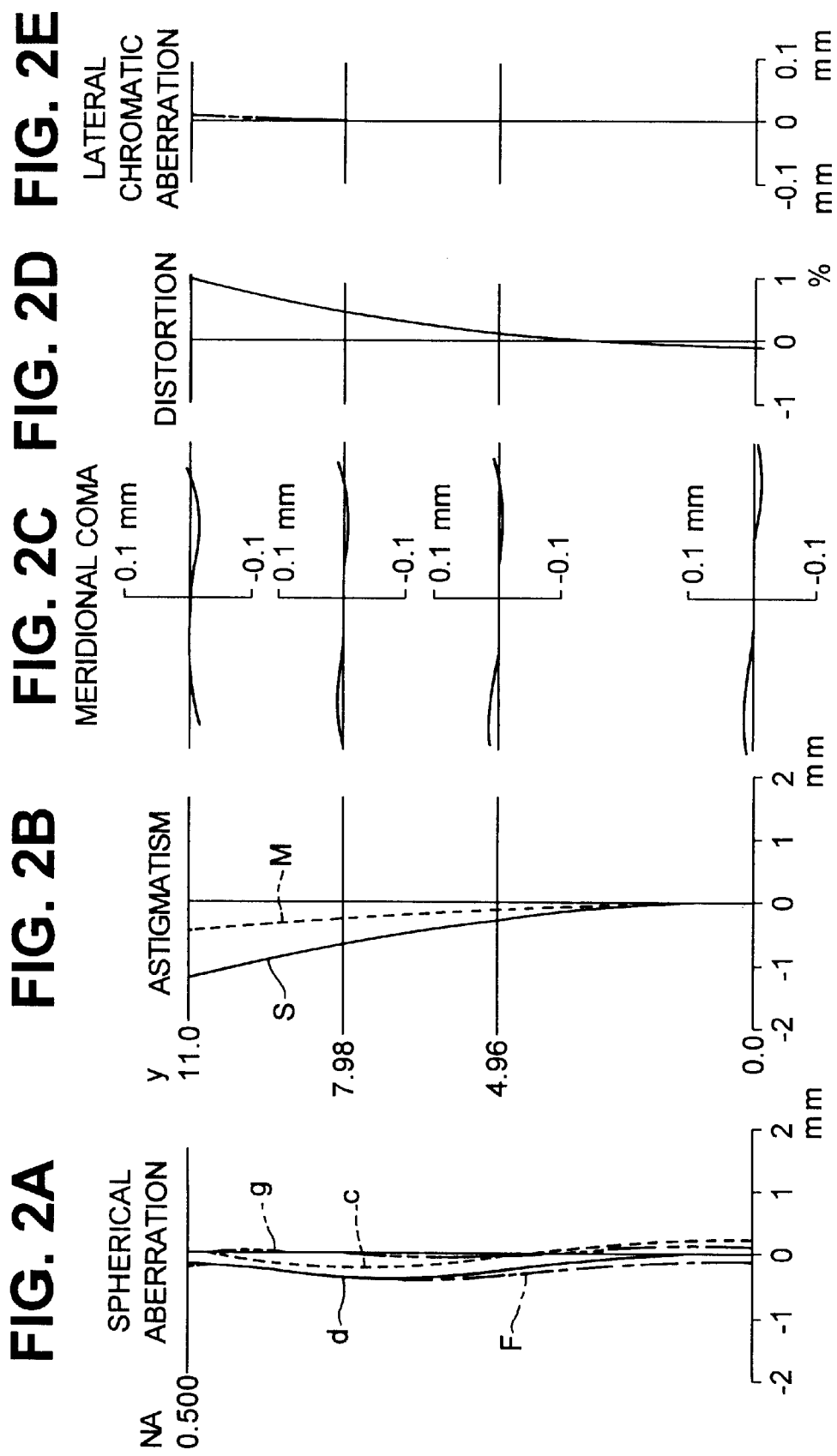
FIGS. 2a through 2e are an illustration of various kinds of aberration of objective lenses for the first embodiment.

Values satisfying the above-mentioned conditions (1) through (4) for the case of an objective lens according to the first embodiment having the above-mentioned parameters are shown in Table 2. Also, various kinds of aberration for the objective lens according to the first embodiment are shown in FIG. 2. Specifically, FIG. 2A shows spherical aberration, FIG. 2B shows the astigmatism aberration, FIG. 2C shows the meridional comatic aberration, FIG. 2D shows the distortion aberration, and FIG. 2E shows the magnification chromatic aberration. Also, in FIG. 2A, d represents line d (587.6 nm), C represents line C (656.3 nm), F represents line F (486.1 nm), and g represents line g (435.8 nm), while in FIG. 2B, the solid line represents a sagittal image surface and the broken line, a meridional image surface. These representations also hold for the second and third embodiments. Although the objective lens according to the present embodiment has a large magnification of 10 and a numerical aperture of 0.5 respectively, chromatic aberration is well corrected both axially and extra-axially.

[TABLE 2]

(Values satisfying the conditions (1)–(4))

| | |
|---|---|
| Condition (1): | nF = 1.4339, vF = 95.57 |
| Condition (2): | nR = 1.6204, vR = 38.35 |
| Condition (3): | vRn = 61.09 |
| Condition (4): | Tf/Ts = 0.1215 |

[SECOND EMBODIMENT]

Figure 3:
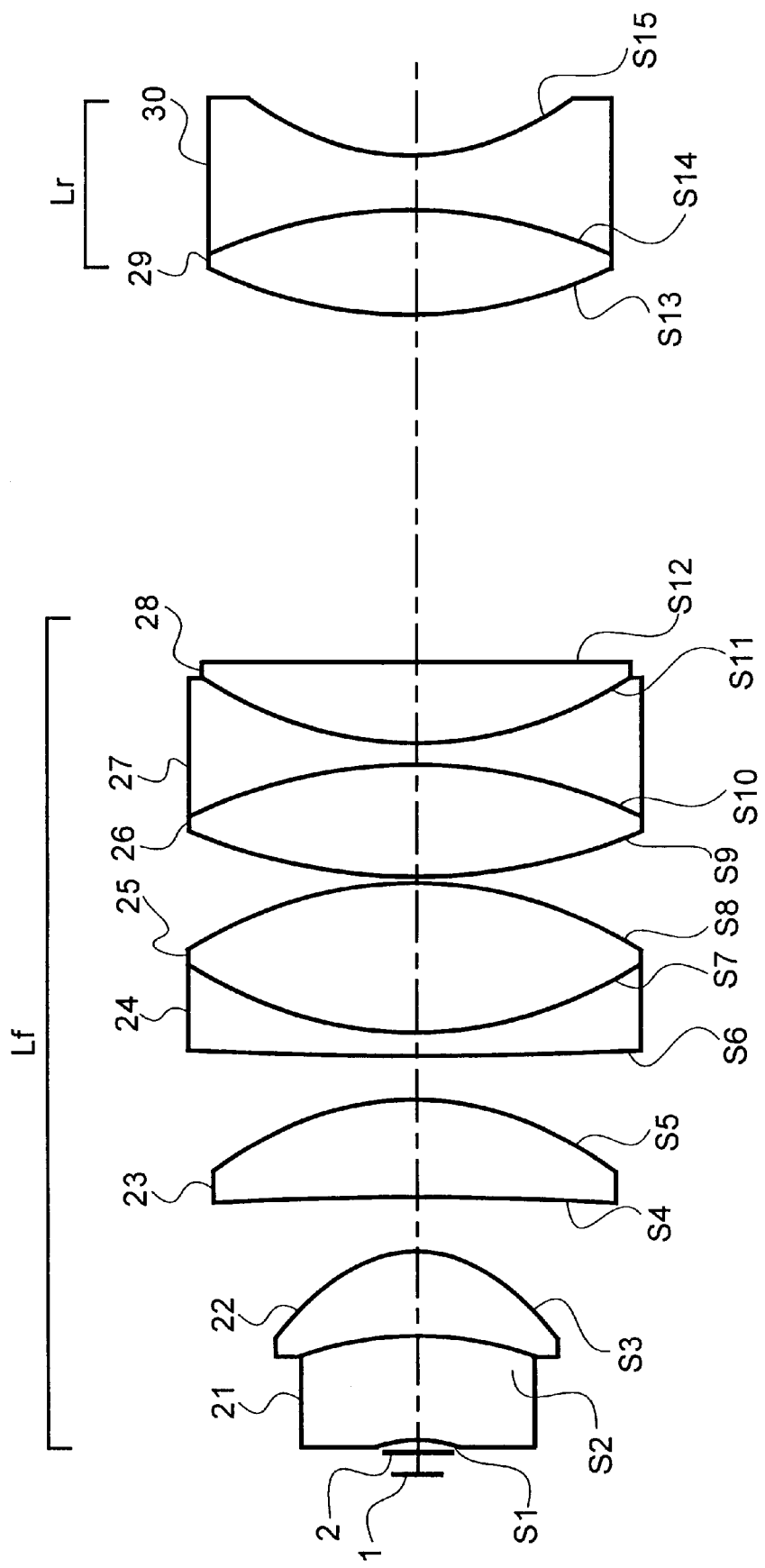
FIG. 3 is a schematic illustration of a configuration of objective lenses related to a second embodiment of the present invention.

FIG. 3 shows a second embodiment of the present invention, in which an objective lens comprises a front-side lens group Lf and a rear-side lens group Lr. The front-side lens group Lf comprises, sequentially from the object side, a junction meniscus lens whose concave side faces the object and which combines a concave lens 21 and a convex lens 22, a convex lens 23, a junction lens combining a concave lens 24 and a convex lens 25, a convex lens 26, and a junction lens combining a convex lens 26, a concave lens 27, and a convex lens 28, while the rear-side lens group Lr comprises a junction lens combining a convex lens 29 and a concave lens 30.

The above-mentioned lens parameters are given in Table 3. The objective lens has a focal distance f=10.0 mm, a numerical aperture N.A.=0.75, a magnification β=−20.0, and a working distance W.D.=1.427 mm.

[TABLE 3]

| LENS SURFACE (s) | RADIUS OF CURVATURE (r) | SURFACE SPACING (d) | REFRACTIVE INDEX (nd) | ABBE'S NUMBER (vd) |
|---|---|---|---|---|
| 1) | −5.827 | 5.0 | 1.45847 | 67.72 |
| 2) | −13.538 | 3.9 | 1.60300 | 65.42 |
| 3) | −7.402 | 2.7 | | |
| 4) | −199.845 | 4.5 | 1.48563 | 85.20 |
| 5) | −16.144 | 1.85 | | |
| 6) | 160.960 | 1.0 | 1.62044 | 38.35 |
| 7) | 19.711 | 7.1 | 1.43388 | 95.57 |
| 8) | −21.475 | 0.2 | | |
| 9) | 34.552 | 5.3 | 1.43388 | 95.57 |
| 10) | −23.972 | 1.0 | 1.57501 | 41.42 |
| 11) | 20.659 | 3.9 | 1.48563 | 85.20 |
| 12) | ∞ | 16.3 | | |
| 13) | 25.289 | 4.75 | 1.57501 | 41.42 |
| 14) | −22.032 | 2.55 | 1.48749 | 70.41 |
| 15) | 14.178 | | | |

Figure 4:
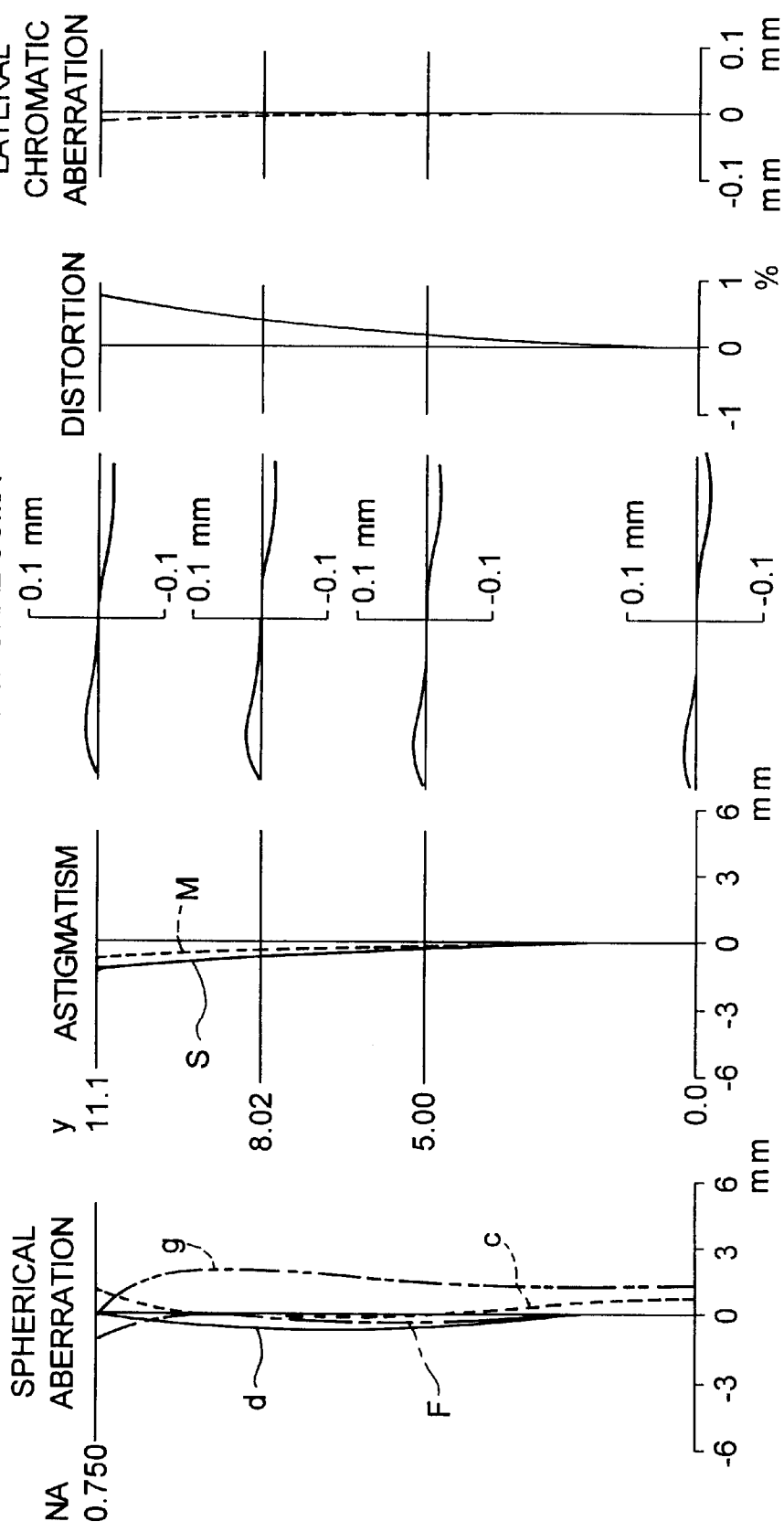
FIGS. 4a through 4e is an illustration of various kinds of aberration of objective lenses for the second embodiment.

Values satisfying conditions (1) through (4) for an objective lens according to the second embodiment are given in Table 4. Also, various kinds of aberration of the objective lens are shown in FIG. 4. The objective lens has a magnification of 20 and numerical aperture of 0.75, having a good flatness and an excellent image-formation performance up to the view field periphery as shown in FIG. 4.

[TABLE 4]

(Values satisfying the conditions (1)–(4))

| | |
|---|---|
| Condition (1): | nF = 1.4585, vF = 67.72 |
| Condition (2): | nR = 1.5750, vR = 41.42 |
| Condition (3): | vRn = 70.41 |
| Condition (4): | Tf/Ts = 0.1731 |

[THIRD EMBODIMENT]

Figure 5:
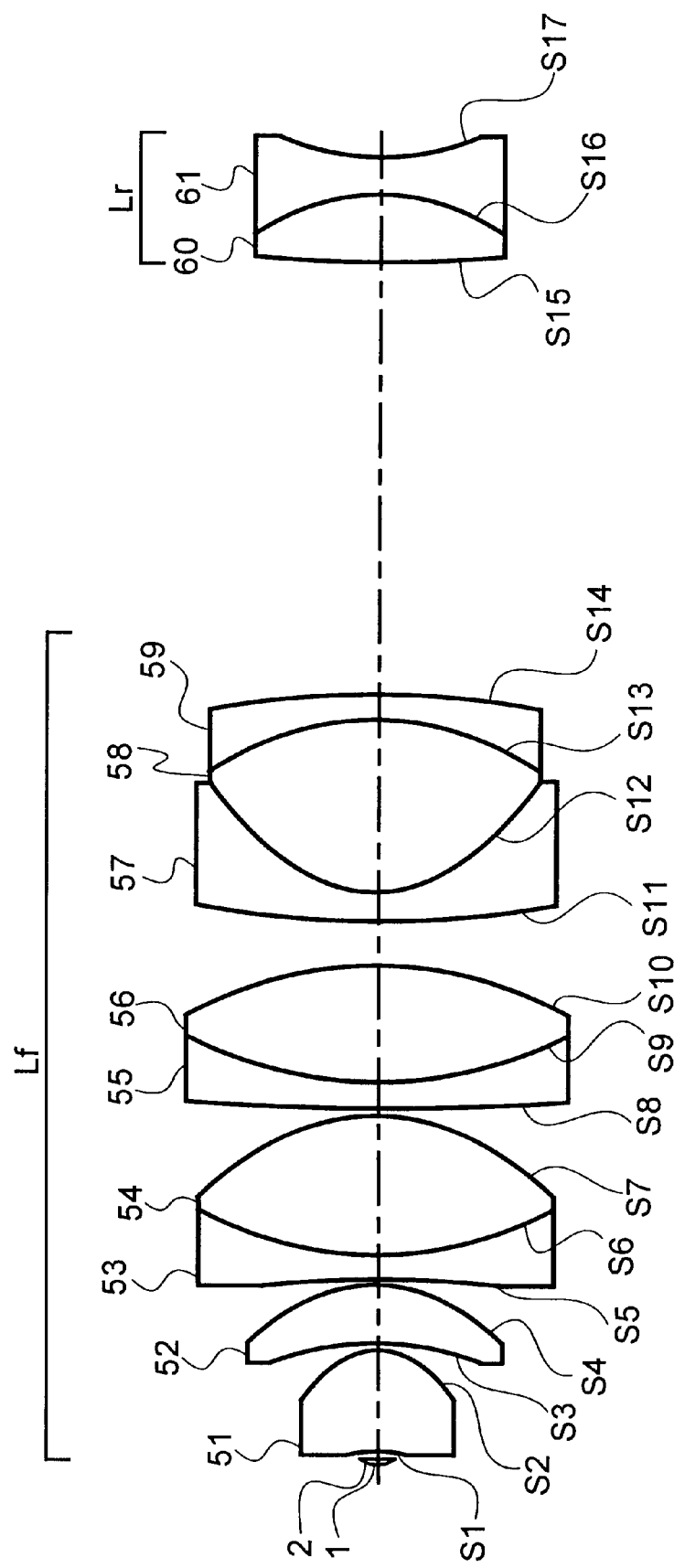
FIG. 5 is a schematic illustration of a configuration of objective lenses related to a third embodiment of the present invention.

FIG. 5 shows an objective lens according to a third embodiment of the present invention, which objective lens comprises a front-side lens group Lf and a rear-side lens group Lr. The front-side lens group Lf comprises, sequentially from the object side, a convex meniscus single lens 51 whose concave side faces the object, a convex lens 52, a junction lens combining a concave lens 53 and a convex lens 54, a junction lens combining a concave lens 55 and a convex lens 56, a concave lens 57, and a junction lens combining a convex lens 58 and a concave lens 59, while the rear-side lens group Lr comprises a junction lens combining a convex lens 60 and a concave lens 61.

The above-mentioned lens parameters are given in Table 5. The objective lens has a focal distance f=5.0 mm, a numerical aperture N.A.=0.9, a magnification β=−40.0, and a working distance W.D.=0.55 mm.

[TABLE 5]

| LENS SURFACE (s) | RADIUS OF CURVATURE (r) | SURFACE SPACING (d) | REFRACTIVE INDEX (nd) | ABBE'S NUMBER (vd) |
|---|---|---|---|---|
| 1) | −3.752 | 4.578 | 1.45874 | 67.72 |
| 2) | −3.704 | 0.15 | | |
| 3) | −14.391 | 2.727 | 1.56907 | 71.31 |
| 4) | −7.748 | 0.2 | | |
| 5) | −99.348 | 1.1 | 1.57501 | 41.42 |
| 6) | 16.839 | 6.5 | 1.43385 | 95.25 |
| 7) | −10.580 | 0.2 | | |

[TABLE 5]-continued

| LENS SURFACE (s) | RADIUS OF CURVATURE (r) | SURFACE SPACING (d) | REFRACTIVE INDEX (nd) | ABBE'S NUMBER (νd) |
|---|---|---|---|---|
| 8) | 139.821 | 1.0 | 1.55200 | 49.71 |
| 9) | 18.045 | 5.423 | 1.48563 | 85.20 |
| 10) | −19.121 | 1.931 | | |
| 11) | 43.833 | 1.3 | 1.55200 | 49.71 |
| 12) | 8.230 | 7.6 | 1.43385 | 95.25 |
| 13) | −14.316 | 1.134 | 1.52682 | 51.35 |
| 14) | −71.614 | 19.503 | | |
| 15) | 85.381 | 2.8 | 1.60342 | 38.03 |
| 16) | −10.834 | 1.7 | 1.48749 | 70.41 |
| 17) | 12.914 | | | |

Figure 6:
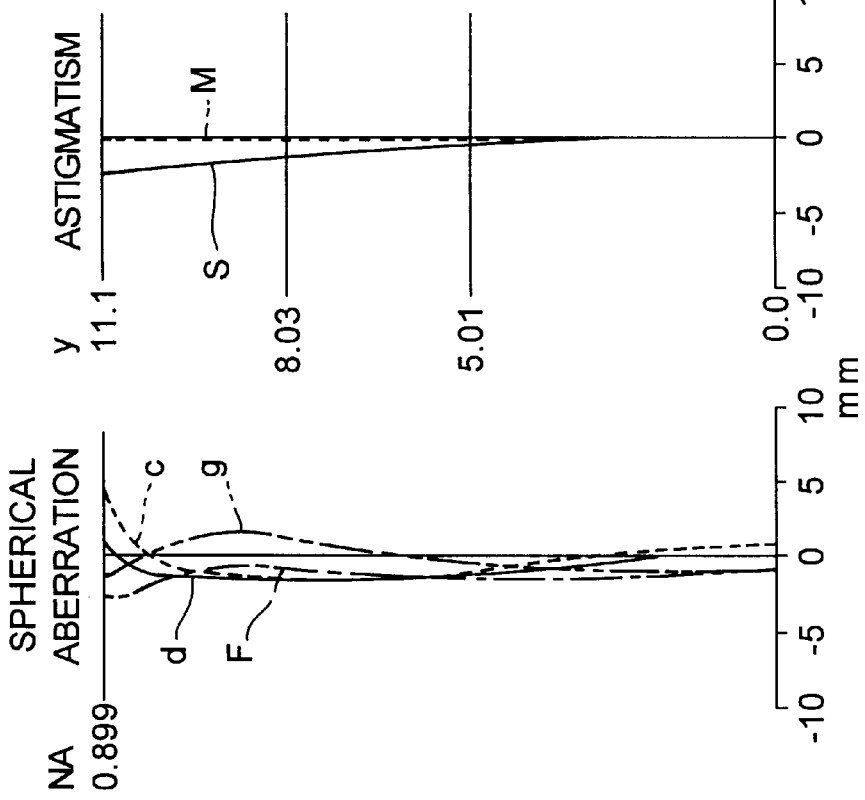
FIGS. 6a through 6e is an illustration of various kinds of aberration for the third embodiment.

Values satisfying conditions (1) through (4) for a case of an objective lens according to the third embodiment are given in Table 6. Also, various kinds of aberration of the objective lens are shown in FIG. 6. The objective lens has a magnification of 40 and a numerical aperture of 0.9, which is rather a large value for a dry-system one.

[TABLE 6]

(Values satisfying the conditions (1)–(4))

| Condition (1): | nF = 1.4585, νF = 67.72 |
| Condition (2): | nR = 1.6034, νR = 38.03 |
| Condition (3): | νRn = 70.41 |
| Condition (4): | Tf/Ts = 0.1729 |

Figure 7:
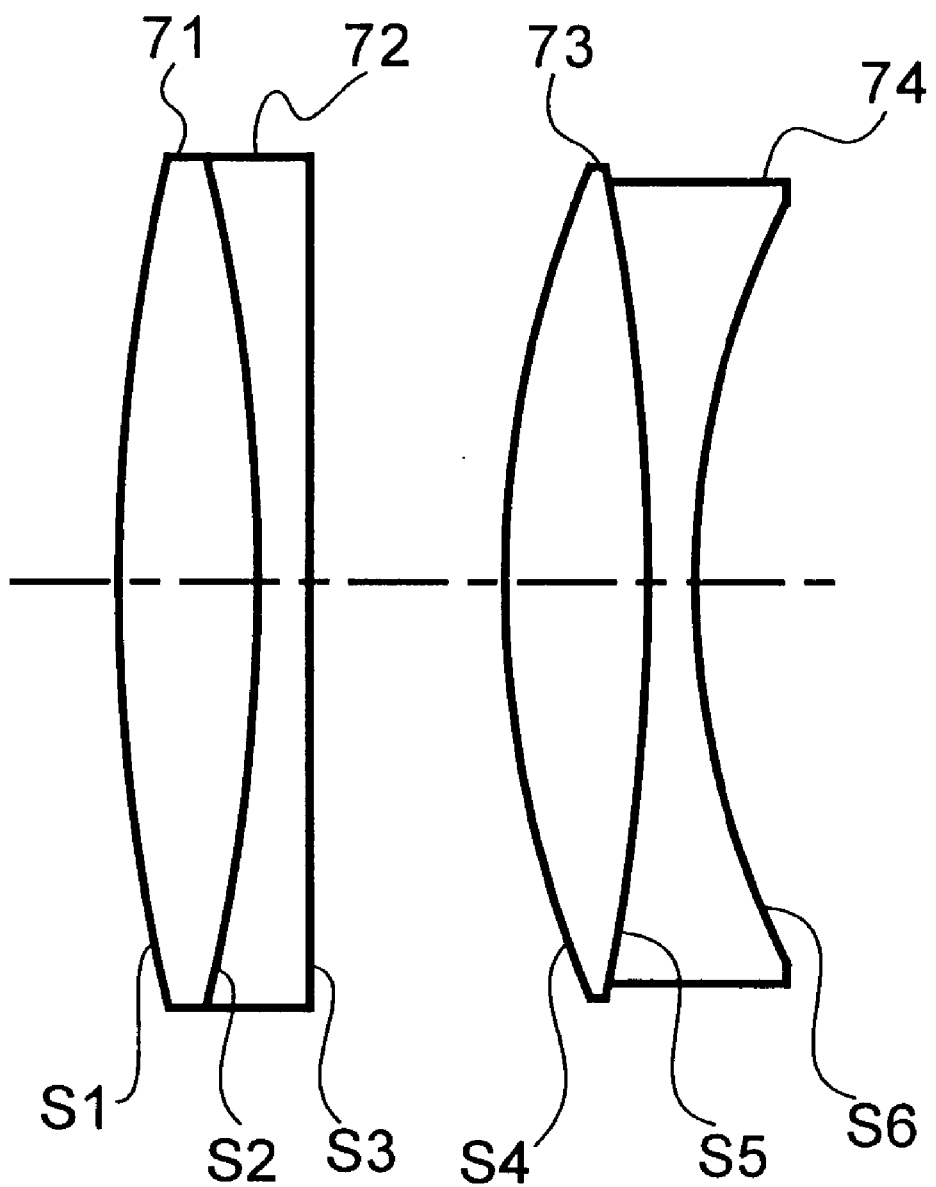
FIG. 7 is a schematic illustration of a second (image-formation) lens used in combination with objective lenses according to the present invention.

Since the microscope objective lens according to the above-mentioned first through third embodiments is of an infinite-system correction type, the objective lens alone is not capable of forming images. Therefore, the objective lens is actually combined with a second objective lens (image-formation lens) shown in FIG. 7, to provide appropriate values of the above-mentioned various kinds of aberration. The image-formation lens comprises, as shown in FIG. 7, two pairs of junction lenses: one combining lenses 71 and 72 and the other, lenses 73 and 74. The parameters of this image-formation lens are given in Table 7.

[TABLE 7]

| LENS SURFACE (s) | RADIUS OF CURVATURE (r) | SURFACE SPACING (d) | REFRACTIVE INDEX (nd) | ABBE'S NUMBER (νd) |
|---|---|---|---|---|
| 1) | 75.043 | 5.1 | 1.62280 | 57.03 |
| 2) | −75.043 | 2.0 | 1.74950 | 35.19 |
| 3) | 1600.580 | 7.5 | | |
| 4) | 50.256 | 5.1 | 1.66755 | 41.96 |
| 5) | −84.541 | 1.8 | 1.61266 | 44.40 |
| 6) | 36.911 | | | |

As explained above, the present invention provides an objective lens that has a high transmission factor for light in the near-ultraviolet range (wave-length: 340 to 380 nm), a large numerical aperture, and good correction of various kinds of aberration and that also enables fluorescence observation, at high contrast, by use of application-type illumination using near-ultraviolet light as excitation light. The objective lens according to the present invention is capable of correcting various kinds of aberration even during bright field observation, and it is therefore very useful for bright field observation as well as florescence observation.

We claim:

1. A microscope objective lens for observing an image, produced at one side, of an object, located at another side, comprising:

a front lens group including a junction meniscus lens with a concave side facing said object; and a rear lens group including a positive lens component composed of at least one positive lens element and at least one negative lens element, said front lens group and said rear lens group arranged in this order from the object with a distance between them, wherein at least one of lens elements of said junction meniscus lens which is nearest to said object is made from of a glass material having a refractive index nF and an Abbe's number νF, and at least one lens of said positive lens elements of said rear lens group is made from a glass material having a refractive index nR and an Abbe's number νR, and the following conditions are satisfied:

$nF \leq 1.50, \nu F > 65$ $nR \leq 1.65, 35 < \nu R < 50.$

2. The microscope objective lens as claimed in claim 1, wherein said front lens group includes at least one junction lens having a positive refractive index which is positioned farther away from the object with a convex side facing said rear lens group and a concave side of said junction lens effecting correction of chromatic aberration, spherical aberration, and other kinds of aberration.

3. The microscope objective lens as claimed in claim 1, wherein said negative lens elements of said rear lens group are made from a glass material with an Abbe's number νRn, and some of the lenses are made of glass materials with the Abbe's number 50 or less, the objective lens satisfying the following conditions:

$\nu Rn\ 60$ $(Tf/Ts) < 0.25$ where Ts is a total sum of central thicknesses of glass parts of all lenses composing said front lens group and said rear lens group, and Tf is a total sum of central thicknesses of all lenses made of glass materials having an Abbe's number of 50 or less.

4. The microscope objective lens as claimed in claim 3, wherein said front lens group includes at least one junction lens having a positive refractive index which is positioned farther away from the object with a convex side facing said rear lens group and a concave side of said junction lens effecting correction of chromatic aberration, spherical aberration, and other kinds of aberration.

5. The microscope objective lens as claimed in claim 4, wherein said front lens group further includes a convex lens positioned between said junction meniscus lens and said junction lens.

6. The microscope objective lens as claimed in claim 5, wherein said front lens group further including a junction lens composed of a first convex lens, a concave lens and a second convex lens in this order from the object, the second convex lens facing said rear lens group.

7. A microscope objective lens for observing an image, produced at one side, of an object, located at another side, comprising:

a front lens group including a meniscus lens with a concave side facing said object; and a rear lens group including at least one lens component composed of a positive lens element and a negative lens element, said front lens group and said rear lens group arranged in this order from the object with a gap between them, wherein said meniscus lens is made from of a glass material having a refractive index nF and an Abbe's number υF, and at least one lens of said positive lens elements of said rear lens group is made from a glass material having a refractive index nR and an Abbe's number υR, and the following conditions are satisfied:

nF≦1.50,υF>65 nR≦1.65,35<υR<50.

8. The microscope objective lens as claimed in claim 7, wherein said front lens group further including at least one junction lens having a positive refractive index which is positioned farther away from the object with a convex side facing said rear lens group and a concave side of said junction lens effecting correction of chromatic aberration, spherical aberration, and other kinds of aberration.

9. The microscope objective lens as claimed in claim 7, wherein said negative lens elements of said rear lens group are made from a glass material with an Abbe's number υRn and some of the lenses are made of glass materials with the Abbe's number 50 or less, the objective lens satisfying the following conditions:

υRn>60

(Tf/Ts)<0.25 where Ts is a total sum of central thicknesses of glass parts of all lenses composing said front lens group and said rear lens group, and Tf is a total sum of central thicknesses of all lenses made of glass materials having an Abbe's number of 50 or less.

10. The microscope objective lens as claimed in claim 9, wherein said front lens group further including at least one junction lens having a positive refractive index which is positioned farther away from the object with a convex side facing said rear lens group and a concave side of said junction lens effecting correction of chromatic aberration, spherical aberration, and other kinds of aberration.

11. The microscope objective lens as claimed in claim 10, wherein said front lens group further including a convex lens positioned between said meniscus lens and said junction lens.

12. The microscope objective lens as claimed in claim 11, wherein the front lens group further including a concave-convex junction lens, a concave lens and a convex-concave junction lens positioned in this order from the object and facing said rear lens group.

13. The microscope objective lens as claimed in claim 7, further including an image-formation lens composed of two pairs of junction lenses.

14. The microscope objective lens as claimed in claim 13, wherein said negative lens elements of said rear lens group are made from a glass material with an Abbe's number υRn and some of the lenses are made of glass materials with the Abbe's number 50 or less, the objective lens satisfying the following conditions:

υRn>60

(Tf/Ts)<0.25.

15. A microscope objective lens for observing an image, produced at one side, of an object, located at another side, comprising:

a front lens group with positive-refractive power including a junction meniscus lens with a concave side facing said object;

a rear lens group including a positive lens component composed of at least one positive lens element and at least one negative lens element, said front lens group and said rear lens group arranged in this order from the object with a distance between them, and an image-formation lens including at least one junction lens composed of at least one positive lens element and one negative lens element, wherein at least one of lens elements of said junction meniscus lens which is nearest to said object is made from of a glass material having a refractive index nF and an Abbe's number υF, and at least one lens of said positive lens elements of said rear lens group is made from a glass material having a refractive index nR and an Abbe's number υR, and the following conditions are satisfied:

nF≦1.50,υF>65 nR≦1.65,35<υR<50.

16. The microscope objective lens as claimed in claim 15, wherein said front lens group further including at least one junction lens having a positive refractive index which is positioned farther away from the object with a convex side facing said rear lens group and a concave side of said junction lens effecting correction of chromatic aberration, spherical aberration, and other kinds of aberration.

17. The microscope objective lens as claimed in claim 15, wherein said negative lens elements of said rear lens group are made from a glass material with an Abbe's number υRn and some of the lenses are made of glass materials with the Abbe's number 50 or less, the objective lens satisfying the following conditions:

υRn>60

(Tf/Ts)<0.25 where Ts is a total sum of central thicknesses of glass parts of all lenses composing said front lens group and said rear lens group, and Tf is a total sum of central thicknesses of all lenses made of glass materials having an Abbe's number of 50 or less.

18. The microscope objective lens as claimed in claim 17, wherein said front lens group further including at least one junction lens having a positive refractive index which is positioned farther away from the object with a convex side facing said rear lens group and a concave side of said junction lens effecting correction of chromatic aberration, spherical aberration, and other kinds of aberration.

19. The microscope objective lens as claimed in claim 18, wherein said front lens group further including a convex lens positioned between said junction meniscus lens and said junction lens.

20. The microscope objective lens as claimed in claim 19, wherein said front lens group further including a junction lens composed of a first convex lens, a concave lens and a second convex lens in this order from the object, the second convex lens facing said rear lens group.

* * * * *